United States Patent [19]

Azmak

[11] Patent Number: 5,627,831

[45] Date of Patent: May 6, 1997

[54] PERSONAL COMMUNICATION NETWORK HAND OVER

[75] Inventor: Okan Azmak, Dallas, Tex.

[73] Assignee: Northern Telecom Limited, Ontario, Canada

[21] Appl. No.: 509,699

[22] Filed: Jul. 31, 1995

[51] Int. Cl.[6] .............................. H04Q 7/22; H04J 3/16
[52] U.S. Cl. ........................... 370/332; 379/60; 455/33.2
[58] Field of Search ............................... 370/95.1, 95.3, 370/13, 17, 110.1, 53, 54, 58.1, 58.2, 58.3, 60; 455/33.2, 49.1, 54.1, 54.2, 56.1, 67.1, 33.1; 379/60, 59, 58

[56] References Cited

U.S. PATENT DOCUMENTS

| | | | |
|---|---|---|---|
| 5,189,734 | 2/1993 | Bailey et al. | 455/33.2 |
| 5,325,419 | 6/1994 | Connolly et al. | 379/60 |
| 5,432,843 | 7/1995 | Bonta | 455/35.2 |

OTHER PUBLICATIONS

Personal Communications Services (PCS) Network Access Services to PCS Providers, Bellcore Special Report SR–TSV–002459, Issue 2, Oct. 1993.

PCS Access Services Interface Specification in Suport of PCS Routing Service, PCS Home Database Service, and PCS IS–41 Message Transport Service, Bellcore Generic Requirements GR–1411–CORE, Issue 1, Mar. 1994.

Switching and Signaling Generic Requirements for Network Access Services to Personal Communications Services (PCS) Providers, Bellcore Generic Requirements GR–2801–CORE, Issue 1, Dec. 1993.

Cellular Radio–Telecommunications Intersystem Operations: Intersystem Handoff, EIA/TIA Interim Standard, EIA/TIA/IS–41.2–B, Dec. 1991.

Cellular Radio–Telecommunications Intersystem Operations: Data Communications, EIA/TIA Interim Standard, EIA/TIA/IS–41.5–B, Dec. 1991.

The GSM System for Mobile Communications, M. Mouly and M. Pautet, Palaiseau, France, International Book Number 2–9507190–0–7, 1992.

European digital cellular telecommunications system (Phase 2); Mobile–services Switching Centre–Base Station System (MSC–BSS) Interface Layer 3 Specification (GSM 08.08), European Telecommunications Standards Institute, Oct. 1993.

European digital cellular telecommunications system (Phase 2); Mobile radio interface layer 3 specification (GSM 04.08), European Telecommunications Standards Institute, Jul. 1, 1994.

Cellular Radio–Telecommunications Intersystem Operations: Authentication, Signaling Message Encryption and Voice Privacy, TIA/EIA Telecommunications Systems Bulletin, TSB51, May 1993.

Primary Examiner—Wellington Chin
Assistant Examiner—Huy D. Vu
Attorney, Agent, or Firm—Finnegan, Henderson, Farabow, Garrett & Dunner, L.L.P.

[57] ABSTRACT

A technique for handing over between PCS networks that are connected to the ISDN/AIN switches wherein the PCS networks have source-centric hand over and the ISDN/AIN switching infrastructure has target-centric hand over by using AM components.

12 Claims, 2 Drawing Sheets

PERSONAL COMMUNICATION NETWORK HAND OVER

BACKGROUND OF THE INVENTION

1. Field Of The Invention

The present invention relates to personal communication networks; and more particularly, to a method and system of effecting hand over between personal communication networks.

2. Description Of Related Art

Heretofore, there has been made available certain frequency bands of the electromagnetic spectrum for personal Communications Service networks (PCS). PCS service providers (PSPs) will use these frequency bands to provide radio communications to mobile radio terminals (e.g. portable telephones) in limited geographic areas.

Some PSPs may want to utilize the switching and/or database infrastructure owned and operated by Local Exchange Carriers (LECs), which are companies that provide local telephone service, in some of their market for more efficient use of the PSPs' resources.

There are a number of different proposed PCS technologies. These different PCS technologies use different techniques for communicating with the mobile terminals and different techniques for managing such communication. Different PSPs, of course, may choose different PCS technologies for many reasons.

A PCS network can be viewed as comprised of two major components: network infrastructure and access infrastructure. Network infrastructure contains the switching resources, and in some cases it may include the mobility management databases such as Home Location Register (HLR) and Visitor Location Register (VLR). Access infrastructure contains the access systems, which are referred to herein as Radio Ports (RPs), access system controllers referred to as Radio Port Control Units (RPCUs), and where used, Radio Access Service Controllers, referred to herein as Access Managers (AMs).

When a PSP decides to use an LEC's network infrastructure for switching, this is attractive to the LEC, because it maximizes the use of the LEC network by the PSP, and therefore maximizes the revenue that the LEC can earn from the PSP. It is also attractive to the PSP, because it minimizes the capital investment it will need to put functioning PCS networks into operation.

Interworking between a PSP and an LECs defines an interface having two components: namely, an integrated services digital network (ISDN) programmed component, which supports call processing operations (call setup and termination) and hand over operations (maintaining calls as the mobile terminal moves from one serving area to another); and an IS-41+ programmed component, sometimes referred to as "Generic C Mobility Management" which supports connection and disconnection of the mobile terminals from the network, including operations required for registration, deregistration, authentication of mobile terminals and control of encryption keys for secure communications with the mobile terminals. These interfaces of the PCS network must have access management (AM) functionality which converts various protocols used by access system controllers (BSC) to the standard IS-41+ protocol for communication with the LEC networks. The BSCs when used in a network having a target-centric handover, are referred to herein as Radio Port Control Units (RPCUs), and the AM is referred to as a Radio Access Service Controller (RASC) for such networks to correspond to a major suppliers terminology.

When a mobile terminal moves from the geographic region served by one access system to the geographic region served by another access system, any call in progress to that mobile terminal must be switched from the assigned radio channel on the one access system to a newly assigned channel on the other access system. This operation is known as handover, and requires appropriate operations by both the PCS network and the switching centers of the LEC network.

Automatic Link Transfer (ALT) is a new capability defined for the ISDN interface to enable hand over between access systems. This capability supports a "target-centric" handover procedure—i.e. a handover procedure in which a access system or access system controller which is not currently serving a mobile terminal identifies that it is capable of serving that mobile terminal and initiates a handover operation. For example, in a target-centric handover, the access system measures signals from terminals it is not serving, and, if any of those signals exceed a threshold indicating that the access system could communicate more effectively with the terminal sending that signal, the target access system initiates a handover procedure to switch the terminal to one of its free channels. In this example, the PCS network detects the handover condition and initiates handover, thus it may be referred to as a "network-centric" "target-centric" handover.

In another type of target-centric handover, the mobile terminal initiates the handover. For example, the terminal measures signals from potential target access systems which are not serving it, and, if any of those signals exceed the signals it is receiving from the access system currently serving it, it initiates a handover. This would be a "terminal-centric" "target-centric" handover.

Other PCS technologies use a "source-centric" handover technique. For example, the serving access system measures signals from terminals it is serving, and, if any of these signals fall below a threshold, the serving or source access system initiates handover from the terminal sending that signal. This approach may be termed "network-centric" "source-centric." Also, the mobile terminal may measure the signal from the access system currently serving it, and, if that signal falls below a threshold, it initiates handover to another access system. This approach is termed "terminal-centric" "source-centric."

A PCS access technology which uses the target-centric hand over works well with PCS networks which also employ target-centric hand over. However, it is conceivable that a PCS access technology that uses source-centric hand over might be required to work with an LEC network employing target-centric hand over.

In light of the foregoing, there is a need for a method and system that is capable of effectively supporting source-centric PCS hand over when the network infrastructure only supports target-centric hand over.

SUMMARY OF INVENTION

Accordingly, the present invention is directed to a method and system for hand over that substantially obviates one or more of the problems of the prior art.

Additional features and advantages of the invention will be set forth in the description which follows, and in part will be apparent from the description, or may be learned by practice of the invention. The objectives and other advantages of the invention will be realized and attained by the method and system particularly pointed out in the written description and claims hereof as well as the appended drawings.

To achieve these and other advantages and in accordance with the purpose of the invention, as embodied and broadly described, the invention is a method of effecting handover between a first PCS network and a second PCS network coupled to a local telephone exchange carrier (LEC), wherein the first and the second PCS networks have a source-centric handover and the LEC has a target-centric hand over. the method includes selecting, at a source access system of the first PCS network, a target access system from a list of target access systems compiled in accordance with the relative signal strength of the source access system and access systems other than the source access system of the first PCS network; sending from the source access system of the first network to the selected target access system of the second PCS network a first request for hand over upon the selection of the target access system; sending from the selected target access system of the second PCS network a second request for handover, including a specified channel, to the LEC network in response to the first request for handover; initiating handover procedure at the target access system in the LEC network; and rerouting the PCS connection from the source access system of the first PCS network to the target access system of the second PSC.

In another aspect, the present invention is a system for effecting handover, including a first and a second PCS network, each having a source-centric hand over coupled to an LEC; means at a source access system of the first PCS network for selecting a target access system from a list compiled in accordance with the relative signal strength of the source access system and access systems other than the source access system of the first PCS network; means responsive to the selection of the target access system for sending from the source access system of the first network to the selected target access system of the second PCS network a first request for handover; means responsive to the first request, for sending from the selected target access system of the second PCS network a second request for handover, including a specified channel, to the LEC network; mean for initiating hand over at the target access system in the LEC network; and means for rerouting the connection from the source access system of the first PCS network to the target access system of the second PCS network.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

DESCRIPTION OF PREFERRED EMBODIMENT

For the sake of clarity in describing the method and system of the present invention, the components and functions of the networks that are not concerned with handover, such as general access for call control, for example, and thus are unnecessary to an understanding of the present invention, are omitted from this description. The present invention may be used with several different types of PCS networks.

The present invention enables connection of PCS technologies using source-centric handover techniques to LEC networks expecting target-centric handover techniques without requiring changes to the LEC networks. The invention achieves this by adding functionality to the AM of the respective networks so that the hand over from a source-centric PCS network appears to the LEC network to be a target-centric handover.

Figure 1:
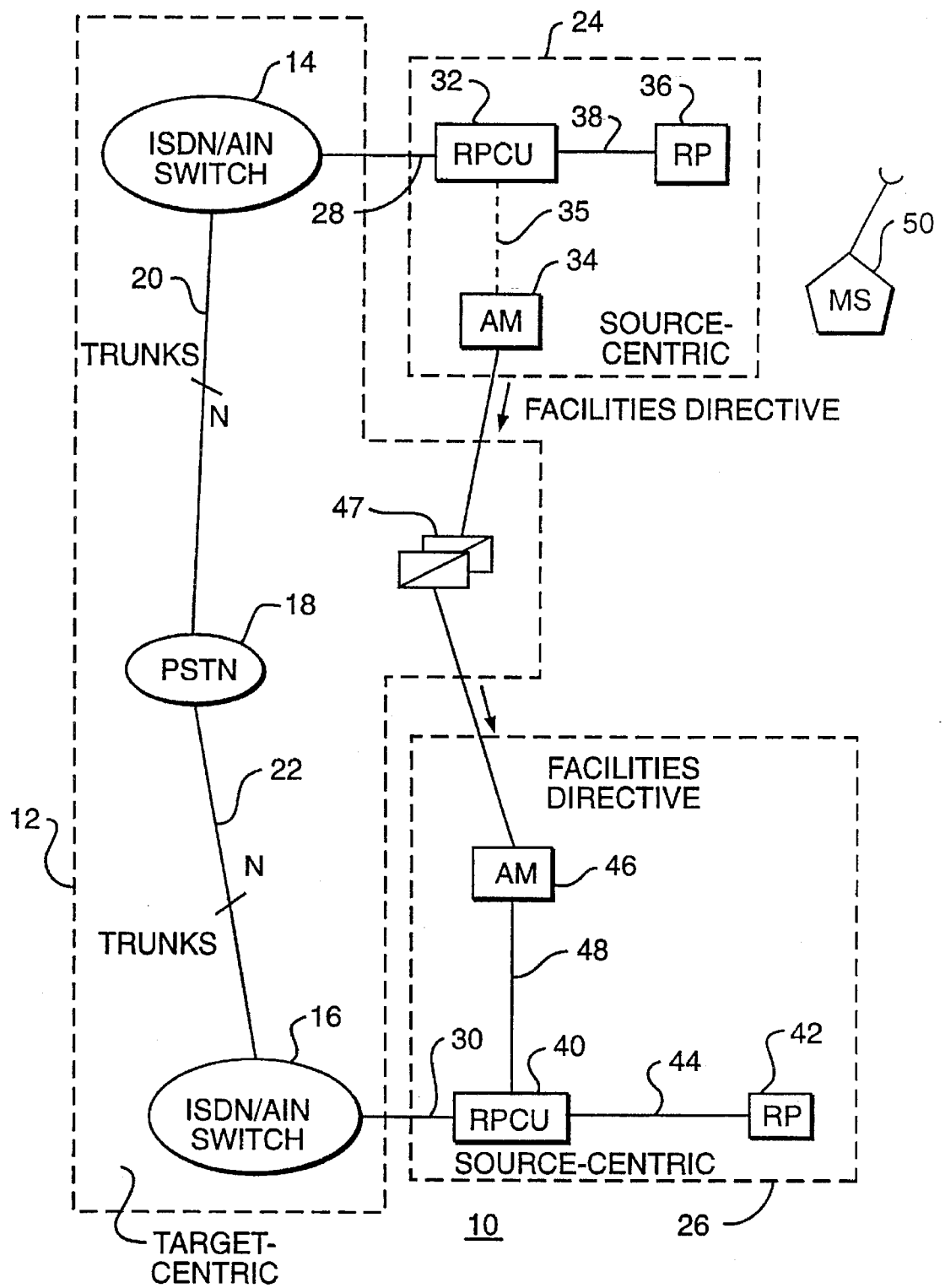
FIG. 1 is a block diagram illustrating the connection of two PCS networks coupled to a PSTN and incorporating the principles of the present invention.

As embodied herein and referring to FIG. 1, the method and system of the present invention, includes an LEC network having a target-centric handover and of PCS networks of the type having a source-centric hand over coupled to one another in accordance with the present invention is referred to at 10. The LEC network within the dashed lines referred to at 12 includes a first ISDN/AIN switch 14 and a second ISDN/AIN (Integrated Systems Digital Network) (Advanced Intelligent Network) switch 16 coupled to a public switch telephone network (PSTN) 18 over trunk lines 20 and 22, respectively. The PCS access systems having a source-centric hand over, are included within the dashed lines referred to at 24 and 26; and the LEC network having the target-centric hand over is included within the dashed lines referred to as 12. The source-centric PCS access system 24 is connected to the switch 14 over line 28; and the PCS source-centric access system 26 is connected to the switch 16 over line 30. The PCS source-centric access system 24 includes an RPCU referred to at 32 and an AM referred to at 34 over line 35. An RP 36 is connected to the RPCU 32 over line 38. The PCS access system 26 includes an RPCU 40, which is functionally similar to the RPCU 32 of the network 24, connected to RP 42 over line 44. An AM referred to at 46, which is functionally similar to the AM 34 of network 24, is connected to the RPCU 40 over line 48.

The Switches 14 and 16 each have two well known software or circuitry components, AIN and ISDN. The AIN component of each switch provides many basic functions for call control, vertical features and mobility management, for example. The ISDN component of the switch provides several capabilities to the network. For example, it acts as an access point for radio systems, and provides basic call control and vertical features on behalf of personal service providers. This ISDN component not only includes call setup and call release, but also control of vertical features, as well as intra and inter-switch handovers. The AM 34 is coupled to the RPCU 32 via IS-41+, and line 28 connects the switch 14 AIN protocol to the RPCU 32. The AM 46 is coupled to the RPCU 40 via IS-41+, and line 30 connects the switch 16 protocol to the RPCU 40.

The switches 14 and 16 connected to the PCS access systems 24 and 26, respectively, have an automatic link transfer (ALT) process, which is a switch capability that allows an active call to be handed over to a different radio system that is controlled by another network switch, due to the movement of a PCS handset or a change in the radio environment. The ALT capability maintains active vertical features during handover.

The AM 34 of the PCS source-centric system 24 and the AM 46 of the source-centric system 26 are connected to one another through a signalling transfer point (STP) 47 of the respective LEC network. The communication between the two networks via the AM components is preferably carried out by the well known SS7 signalling protocol, which is used to send facilities directive messages to an accessed network.

The AM 34 and 46 provide an interface between the networks and the "access technologies" to provide protocol conversion for mobility management. They also retain data on each registered user and active call data. Although functionally the AM 34 and 46 reside on the access side of their respective networks, this functionality can physically reside in the network side.

In the system of the present invention the source access system of the first PCS network includes means, which may be software or circuitry, for selecting a target access system from a list compiled in accordance with the relative signal strength of the source access system and access systems other than said source access system.

As herein embodied, a mobile terminal (MS) 50 maintains a running average of signal strength measurements for the source access system and up to 6 neighboring access systems, and reports these to the RPCU 32. When the RPCU 32 decides that a handover is necessary due to falling transmission quality, for example, it forms a target cell list in the order of preference based on an internal decision criteria.

In accordance with the present invention the system includes means responsive to the selection of the target base station for sending from the source base station of the first PCS network to the selected target base station of the second PCS network a first request for handover.

As embodied herein, the RPCU 32 includes means for reporting the target cell list and the need for a new base station to the AM 34. The AM 34 selects the target station and transmits a first request for hand over to the AM 46 of the network 26. More specifically, the AM 34 of the source access system includes means for sending a Facilities Directive message using the signalling system SS7 via the STP 47 requesting handover to the AM of the selected target access system. The AM 34 of the source access system also requests from the RPCU of the target access system an allocation of a radio channel for handover.

The handover system of the present invention includes means responsive to the first request, for sending from the RPCU of the selected target access system of the second PCS network a second request for handover, including a specified channel, to the LEC network.

As herein embodied, the RPCU 40 includes means, which may be circuitry or software, for allocating the radio channel for hand over in response to the request of the AM 34; and includes means for sending a second hand over request together with the specified allocated channel to the LEC network via the ISDN interface of switch 16. This second handover request comes from the target access system 26 and therefore appears to the LEC network to be a target-centric handover even though handover was initiated at the source access system in the PCS network 24.

The system of the present invention also includes means for initiating the handover procedure at the target access system in the LEC network. As herein embodied, the switch 16 of the LEC network which serves the target access system initiates the handover procedure in the LEC network, sending a handover request specifying the allocated channel to the switch 14 serving the source access system over the transfer point 47 of the SS7 signalling network. The switch 14 serving the source access system reports the channel allocation to the RPCU of the source access system via the ISDN interface of the switch. The RP CU 32 of the source access system includes means for reporting the channel allocation to the MS 50 via the RP 36 in response to the reporting of the channel allocation by the switch 14. The MS 50 includes means for tuning to the newly allocated channel and for sending a signal on the allocated channel in response to the reporting of the channel allocation. The RPCU 40 of the target access system includes means for receiving the signal on the allocated channel via the RP 42. The RPCU 40 in response thereto sends to the LEC network switch 16 serving the target access system a message reporting that the MS 50 has tuned to the allocated channel. The switch 16 serving the target access system includes means for sending a message via the SS7 signalling system to the switch 14 serving the source access system indicating that the MS 50 has tuned to the allocated channel. The switch 14 in response to the message via the SS7 signalling system that the MS 50 has tuned to the allocated channel reroutes the PSTN 18 connection from the first PCS network 24 to the target access system of the second PCS network 26.

Figure 2:
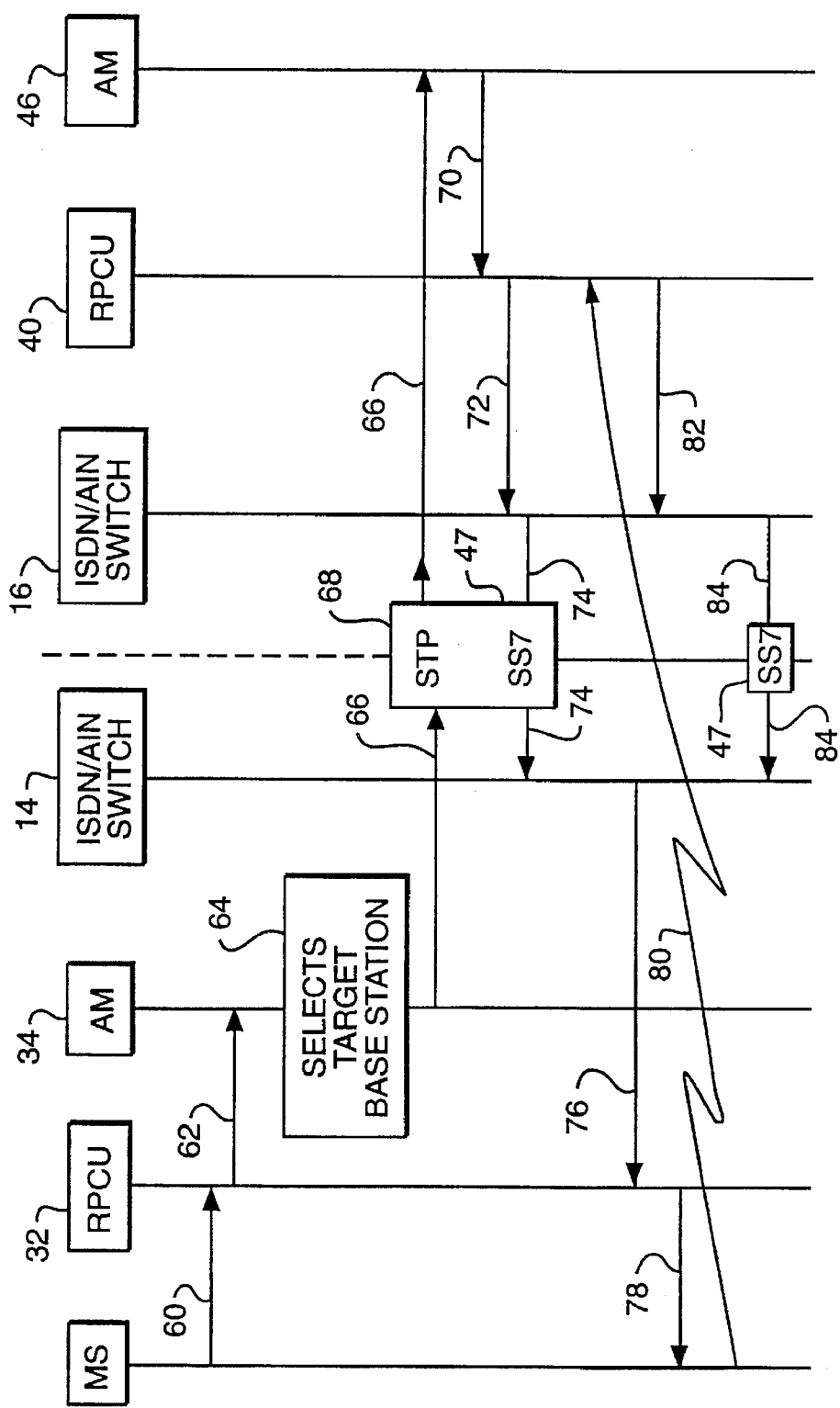
FIG. 2 is a line diagram illustrating the steps in handing over from a source-centric PCS network to another source-centric PCS network coupled to a target-centric LEC network.

The method of effecting a hand over from a PCS network having a source centric handover to another PCS network will now be discussed in connection with FIG. 2. In describing the method of hand over, it is assumed that the MS 50 is to be handed over from its source access system 24 to its target access system 26.

The method of the present invention includes selecting, at a source access system a target access system from a list of target access systems compiled in accordance with the relative signal strength of the source access system and access systems other than the source access system.

Referring to the line diagram of FIG. 2, the terminal MS determines that the signal received from the source access system 24, via the RP 36 has fallen below threshold. MS 50 makes a list of access systems providing stronger signals than the serving source station and sends the list and request for hand over to the RPCU as indicated by line 60. The RPCU of the source access system reports the list of target access systems and the need for hand over to the AM of the source access system as indicated by line 62. The AM then selects the target access system from the list as indicated by block 64.

The method according to the present invention then includes sending from the source access system of one network to the selected target access system of another network a first request for handover upon the selection of the target access system. This is accomplished by the AM of the source access system first sending a Facilities Directive message requesting a hand over to the AM of the target access system of the other network as noted by line 66 via the signal transfer point STP as indicated by block 68. Then the AM of the target access system requests from the RPCU of the target access system the allocation of a radio channel to which the MS is to be handed over as shown by line 70.

The method of the present invention further includes sending from the selected target access system of the second PCS network a second request for handover, including a specified channel, to the LEC network in response to the first request for handover. This is accomplished by the RPCU of the target access system allocating the radio channel and sending the request along with the specified channel to the LEC network via the ISDN/AIN switch 16 as indicated by line 72. This hand over request comes from the target access system and therefore appears to the LEC network to be a target-centric hand over even though the hand over was initiated at the source access system of the PCS network.

In response to this request as indicated by line 72 the handover procedure at the target access system in the LEC network is initiated. This is accomplished by the network switch ISDN/AIN 16 serving the target access system sending a hand over request specifying the allocated channel to the ISDN/AIN switch 14 serving the source access system over the SS7 signalling network as indicated by lines 74. The AISDN/AIN switch 14 serving the source access system then reports the channel allocation to the RPCU 32 of the source access system as indicated by line 76. The RPCU 32 of the source access system reports the channel allocation to the MS via the RP as indicated by line 78. The terminal MS then tunes to the newly allocated channel and sends a signal over the new channel. The RPCU 40 of the target access system receives the signal on the allocated channel via the RP as shown by line 80. The RPCU 40 of the target access system then sends a message to the LEC network switch 16 of the target access system reporting that the MS has tuned to the allocated channel as shown by line 82. The network ISDN/AIN switch 16 serving the target access system sends a message via the SS7 signalling system to the network ISDN/AIN switch 14 serving the source access system indicating that the MS has tuned to the allocated channel as indicated by line 84. The hand over is completed by rerouting the PSTN connection from the source access system of the first PCS network 24 to the target access system of the second PCS network 26.

In summary, in the previously described inter-switch handover each network switch 14 and 16 interacts with an AM. After the procedure is performed the "target" resources (e.g. new network switch) are engaged. In supporting the handover each AM communicates with other AMs This requirement is due to the fact that the handover is initiated by the source access system, whereas the architecture of the target centric system relies on the new access system to initiate the process. Hence, in maintaining homogeneity in the way the network handles handover, the illusion is created from the perspective of the network switch of the target-centric LEC network that the new or target network AM is initiating the handover process without altering the signalling on the access side.

When the source or old AM is informed of a necessity to handover an active call to another switch, it directly informs the new or target AM of the necessary parameters (such as encryption information) without invoking any call associated signalling with the network switch. The new AM confirms that resources are available. After resources are allocated by the new access system, the new AM initiates call setup procedure to its network switch with the feature activity indicating the previously mentioned ALT. Thus, from both the network's and the access side's perspectives, standard procedures are executed to successfully perform hand over through a target-centric LEC network.

In order to support inter-switch handover, the old or source AM provides the encryption keys to the new AM so that the call can continue in ciphered mode after the handover is completed and release connection to the source network switch.

The new or target AM performs similar tasks on the other end: such as performing protocol conversion to inform the new or target access system of the handover request, and to pass connect layer information and reference number needed to complete handover to the new base station, and to establish connection to the new network switch.

For a more detailed understanding of the protocol and other standardizations, or the regulations covering personal communication networks, or PCS networks in general, reference is made to the following publications, which are incorporated by reference.

[1] SR-TSV-002459, Personal Communications Services (PCS) Network Access Services to PCS Providers, Issue 2, Oct. 1993.

[2] GR-1411-CORE, PCS Access Services Interface Specification in Support of PCS Routing Service, PCS Home Database Service, and PCS 1S-41 Message Transport Service, Issue 1, Mar. 1994.

[3] UR-2801-CORE, Switching and Signaling Generic Requirements to Support 1.8 GHz Personal Communications Services (PCS) Providers, Issue 1, Dec. 1993.

[4] EIA/TIA/IS-41-B, Cellular Radio Telecommunications Intersystem Operations, December 1991.

[5] Mouly, M., Pautet, Marie-B., The GSM System for Mobile Communications, 1992.

[6] GSM 08.08, BSS-MSC Layer 3 Specification, European Telecommunications Standards Institute, 1992.

[7] OSM 04.08, Mobile Radio Interface Layer 3 Specification, European Telecommunications Standards Institute, 1992.

[8] TR45, TSB Published AUTHENTICATION, SIGNALING, MESSAGE ENCRYPTION and VOICE PRIVACY, November 1992.

It will be apparent to those skilled in the art that various modifications and variations can be made in the method and system of the present invention without departing from the spirit or scope of the invention. Thus, it is intended that the present invention cover the modifications and variations of this invention provided they come within the scope of the appended claims and their equivalents.

What is claimed is:

1. A method of effecting handover between a first and a second PCS network coupled to an LEC network via a plurality of ISDN/AIN switches; wherein the first and second PCS networks each have a source-centric handover and the LEC has a target-centric handover, the method comprising:

selecting, at a source access system of the first PCS network, a target access system from a list of target access systems compiled in accordance with the relative signal strength of the source access system and access systems other than the source access system of the first PCS network;

sending from the source access system of the first PCS network to the selected target access system of the second PCS network a first request for handover upon the selection of the target access system;

sending from the selected target access system of the second PCS network a second request for handover, including a specified channel, to the LEC network in response to the first request for handover;

initiating handover procedure in the ISDN/AIN switch of the LEC network associated with the target access system; and rerouting the PCS connection from the source access system of the first PCS network to the target access system of the second network.

2. The method of claim 1 wherein the step of selecting the target access system from the list of target access systems comprises the substeps of:

measuring at a mobile terminal the strength of signals being received from RPs associated with RPCUs connected to each the plurality of ISDN/AIN switches and compiling a list of those RPs providing stronger signals than the RP of the source access system;

reporting by the source RPCU to the AM of the source access system of a need for handover including a list of the complied target access systems; and selecting the target access system from the list of target access systems by the AM of the source access system.

3. The method of claim 1 wherein the step of sending from the source access system to the selected target access system the first request for handover, comprises the substep of:

sending a message requesting handover by an AM of the source access system to an AM of the selected target access system.

4. The method of claim 1 wherein the step of sending from the selected target access system a second request for handover, including a specified channel, comprises the substeps of:

requesting, by an AM of the target access system, allocation of a radio channel for handover by an RPCU of the target access system;

allocating the specified radio channel for handover by the RPCU of the target access system; and sending the request for handover and the specified allocated radio channel by the RPCU of the target access system to the LEC network via said ISDN/AIN switch.

5. The method of claim 1 wherein the step of initiating handover procedure via the second ISDN/AIN switch of the LEC network, comprises the substeps of:

sending a handover request specifying the allocated channel to the first ISDN/AIN switch over an SS7 signalling network;

reporting the channel allocation to the RPCU of the source access system via the ISDN/AIN switch associated with the source access system;

reporting by the RPCU of the source access system the channel allocation to the MS via an RP;

tuning to and sending a signal on the allocated channel by the MS;

receiving, by the RPCU of the target access system, the signal on the channel via the RP;

reporting, by the RPCU of the target access system, to the ISDN/AIN switch serving the target access system that the mobile terminal is tuned to the allocated channel; and sending a message to the ISDN/AIN switch serving the source access system from the ISDN/AIN switch serving the target access system via the SS7 signalling system indicating that the MS has tuned to the allocated channel.

6. A method of effecting handover between a first PCS network and a second PCS network coupled to an LEC having a target centric handover, via first and second ISDN/AIN switches respectively, wherein the first and the second PCS networks have a source-centric handover, the method comprising:

measuring at an MS the strength of signals being received from RPs other than the source access system and compiling a list of those providing stronger signals than the source access system;

reporting by the source access system RPCU to the AM of the source access system of a need for handover including a list of target access systems;

selecting, by the AM of the source access system, the target access system from the list of target access systems;

sending a first message requesting handover to the AM associated with the selected target access system;

requesting, by the AM of the target access system, allocation of a radio channel for handover by the RPCU of the target access system;

allocating the radio channel for handover by the RPCU of the target access system;

sending a second request for handover including the specified radio channel by the RPCU of the target access system to the LEC network via the second ISDN/AIN switch;

initiating handover procedure by the second ISDN switch, including specifying the allocated channel to the first ISDN switch over the SS7 signalling network;

reporting the channel allocation to the RPCU of the source access system via the first ISDN switch;

reporting by the RPCU of the source access system the channel allocation to the MS via the RP;

tuning to and sending a signal on the allocated channel by the MS;

receiving, by the RPCU of the target access system, the signal on the channel via the RP of the target access system;

reporting, by the RPCU of the target access system, to the second ISDN/AIN switch that the MS is tuned to the allocated channel;

sending a message to the first ISDN/AIN switch serving the source baase station from the second ISDN/AIN switch serving the target base station via the SS7 signalling system indicating that the MS has tuned to the allocated channel; and rerouting, by the first ISDN/AIN switch serving the source access system, the PSTN connection from the source access system to the target access system.

7. A PCS network coupled to an LEC, wherein the LEC includes a plurality of base stations having switches, each switch having ISDN/AIN portions coupled to a PSTN comprising:

means at a source access system for selecting a target base station from a list of target base stations compiled in accordance with the relative signal strength of a source base station and base stations other than the source base station;

means for sending from the source access system to a selected target access system a first request for handover upon the selection of the target base station;

means for sending from the selected target base station a second request for handover, including a specified channel, to the LEC network via the ISDN/AIN switch of the selected target base station in response to the first request for handover, the ISDN/AIN switch serving the target base station including means for a handover in the LEC network; and the ISDN/AIN switch serving the source base station including means for rerouting the PSTN personal communication connection from the source base station to the target base station.

8. The system of claim 7 wherein the means for selecting the target base station from the list of target base stations comprises:

means for measuring at an MS the strength of signals being received from RPs associated with RPCU's connected to each of said plurality of ISDN/AIN switches and compiling a list of those providing stronger signals than the RP of the source base station;

means for reporting by the source access sytem RPCU to the AM of the source base station of a need for handover including a list of target base stations; and means for selecting the target base station from the list of target base stations by the AM of the source access system.

9. The system of claim 7 wherein the means for sending from the source access system to the selected target access system the first request for handover, comprises:

means for requesting handover by an AM of the source access system to an AM of the selected target access system.

10. The system of claim 7 wherein the means for sending from the selected target access system a second request for handover, including a specified channel, comprises:

mean for requesting, by the AM of the target access system, allocation of a radio channel for handover by an RPCU of the target base station;

means for allocating the specified radio channel for handover by the RPCU of the target base station; and means for sending the request for handover and the specified allocated radio channel by the RPCU of the target access system to the LEC network via the IDSN/AIN switch serving the source base station.

11. The system of claim 7 wherein the means for initiating handover procedure by the ISDN/AIN switch serving the target base station in the LEC network, comprises:

means for sending a handover request specifying the allocated channel to the ISDN/AIN switch serving the source access system over an SS7 signalling network;

means for reporting the channel allocation to the RPCU of the source access system via the ISDN/AIN switch serving the source base station;

means for reporting by the RPCU of the source access system the channel allocation to the MS via an RP;

the MS including means for tuning to and sending a signal on the allocated channel;

means for receiving, by the RPCU of the target access system, the signal on the channel via the RP;

means for reporting, by the RPCU of the target access system, to the ISDN/AIN switch serving the target base station that the MS is tuned to the allocated channel; and means for sending a message to the ISDN/AIN switch serving the source access system from the ISDN/AIN switch serving the target access system indicating that the MS has tuned to the allocated channel via the SS7 signalling system.

12. A system for effecting handover in a personal communication network coupled to an LEC network, wherein the LEC network includes a plurality of switches, each switch having an ISDN and AIN portions coupled to a PSTN, and wherein the PCS network includes an RPCU connected to each of said plurality of ISDN/AIN switches, a plurality of RPs connected to each said plurality of RPCUs and AM coupled to each said RPCU, and wherein the plurality of AMs are in communication with each other through a signal SS7 transfer member, the ISDN/AIN switches including an ALT for providing target-centric handover between the base stations, the system comprising:

means for measuring at a mobile terminal the strength of signals being received from the RPs associated with the RPCUs other than the source base station RPCU and compiling a list of those RPs providing stronger signals than the source base station RPCU;

means for reporting by the source access system RPCU to the AM of the source access system of a need for handover including a list of target base stations;

means for selecting, by the AM of the source access system, the target base station from the list of target base stations;

means for sending a first message requesting handover to the AM associated with the selected target base station;

means for requesting, by the AM of the target access system, allocation of a radio channel for handover by the RPCU of the target base station;

means for allocating the radio channel for handover by the RPCU of the target access system;

means for sending a second request for handover including the specified radio channel by the RPCU of the target access system to the LEC network via the ISDN/AIN switches;

means for initiating handover procedure by the ISDN switch of the target base station in the LEC network, including specifying the allocated channel to the ISDN switch of the source base station over the SS7 signal transfer member;

means for reporting the channel allocation to the RPCU of the source access system via the ISDN switch of the source base station;

means for reporting by the RPCU of the source access system the channel allocation to the MS via the RP;

means for tuning to and sending a signal on the allocated channel by the MS;

means for receiving, by the RPCU of the target access system, the signal on the channel via the RP;

means for reporting, by the RPCU of the target access system, to the ISDN/AIN switch of the target access system that the MS is tuned to the allocated channel;

means for sending a message to the ISDN/AIN switch of the source access system from the ISDN/AIN switch of the target access system indicating that the MS has tuned to the allocated channel via the SS7 signalling transfer member; and means for rerouting, by the ISDN/AIN switch of the source access system, the PSTN connection from the source base station to the target base station.

* * * * *